United States Patent [19]

Leiber

[11] 4,346,942
[45] Aug. 31, 1982

[54] HYDRAULIC BRAKE FORCE AMPLIFIER

[75] Inventor: Heinz Leiber, Leimen, Fed. Rep. of Germany

[73] Assignee: Robert Bosch GmbH, Stuttgart, Fed. Rep. of Germany

[21] Appl. No.: 132,346

[22] Filed: Mar. 20, 1980

[30] Foreign Application Priority Data

May 10, 1979 [DE] Fed. Rep. of Germany ....... 2918785

[51] Int. Cl.³ .............................................. B60T 17/18
[52] U.S. Cl. ...................................... 303/92; 303/114
[58] Field of Search .......................... 303/92, 114–117, 303/119

[56] References Cited

U.S. PATENT DOCUMENTS

| | | | |
|---|---|---|---|
| 3,927,915 | 12/1975 | Adachi | 303/92 X |
| 3,961,828 | 6/1976 | Eckert et al. | 303/92 |
| 4,231,620 | 11/1980 | Leiber | 303/116 X |

Primary Examiner—Duane A. Reger
Attorney, Agent, or Firm—Edwin E. Greigg

[57] ABSTRACT

A hydraulic brake force amplifier for multiple-circuit brake systems provided with a control valve which is actuated by the brake pedal via a travel-limiting spring. Disposed parallel to the control valve is a main cylinder, which is actuatable by the brake pedal either in accordance with pressure or when there is a failure of the pressure supply. In order that the travel path of the pedal will not be unnecessarily long when the pressure supply is intact, an arresting piston member is used, which limits the stroke of the control valve. The arresting piston member is combined with means which, upon failure of the pressure supply, permit its use as a further main cylinder piston. In this manner, a compact and lightweight structure of the brake force amplifier is possible. The brake force amplifier is preferably used in passenger vehicles.

8 Claims, 4 Drawing Figures

HYDRAULIC BRAKE FORCE AMPLIFIER

BACKGROUND OF THE INVENTION

The invention relates to a hydraulic brake force amplifier. A brake force amplifier of this type is known from German Offenlegungsschrift 27 50 491 which has a corresponding U.S. Pat. No. 4,197,710 which is incorporated herein by reference.

Fundamental to this known design is the problem of travel path simulation, which is intended to be limited, when the supply of pressure is intact, in order to keep pedal travel at a minimum.

As is well known, hydraulic brake force amplification systems can be classified as either auxiliary force or external force system. In this connection, the terms "open" and "closed" brake circuits are often used. The first, "open" brake circuits are associated with the external force systems. Intermediate forms are also known in the state of the art, where one circuit is open and one circuit is closed. Such systems have the disadvantage that if the pressure supply fails one brake circuit also fails at the same time.

In auxiliary force amplification systems, a distinction is made for systems where the amplifier portion and the main brake cylinder are disposed together in a tandem arrangement. These systems function without travel path simulators. The pressure volume characteristic of the cooperating brake circuits determines the pedal travel at a particular time. The pedal characteristic is given according to the amount of brake force amplification. These systems are disadvantageous in the event of brake circuit failure, because in that case the pedal travel path is lengthened.

This disadvantage is avoided in systems which utilize a travel path simulator. For human engineering reasons, a relatively short pedal travel path is desired for fully applying brake pressure. If the pressure supply fails, on the other hand, the entire pedal travel path should be utilized for generating brake pressure via the main brake cylinder piston. For these reasons, the state of the art, according to the cited German Offenlegungsschrift 27 50 491, makes use of an arresting piston member, which limits the pedal travel path, or the path simulator's travel, after full brake pressure has been applied. This arresting piston member is not permitted to function if the pressure supply fails. The switchover for the arresting piston member function is accomplished by means of switching valves. These interrelated factors mean that the basic expenditure for a hydraulic amplification system of this kind comprises a brake valve with a travel path simulator, two main brake cylinder pistons and one arresting piston member with switchover valves. The basic expenditure is thus relatively high.

OBJECTS AND SUMMARY OF THE INVENTION

The hydraulic brake force amplifier has the advantage over the prior art that because of a particular disposition of the arresting piston member in combination with a switchover device, the function of the arresting piston member can be utilized in two ways. In the event that the pressure supply is intact, the arresting piston member acts as a limitation for the travel path simulator. In the event of pressure supply failure, the arresting piston member assumes the function of a main brake cylinder. This spares expense for structural elements.

When the pressure supply is intact, one brake circuit functions as an open circuit. A leak in the corresponding brake circuit results in failure of the energy supply. In accordance with further characteristics of the invention, it is attained that the spontaneous failure of the pressure supply in the event of a leaking brake circuit can be prevented by means of an appropriate logical combination of switching signals in an anti-locking apparatus. If a leak in the open brake circuit is recognized by this means, then during brake actuation the associated anti-locking adjustment member is actuated, which then permits no delivery of pressure medium to the outside, that is, to the main brake cylinder. A further opportunity is presented by the usage of a hydraulic linkage which can be disposed, from a three-dimensional standpoint, in any arbitrary manner. Further advantages result from features disclosed herein.

The invention will be better understood and further objects and advantages thereof will become more apparent from the ensuing detailed description of preferred exemplary embodiments taken in conjunction with the drawings.

DESCRIPTION OF THE PREFERRED EMBODIMENTS

Figure 1:
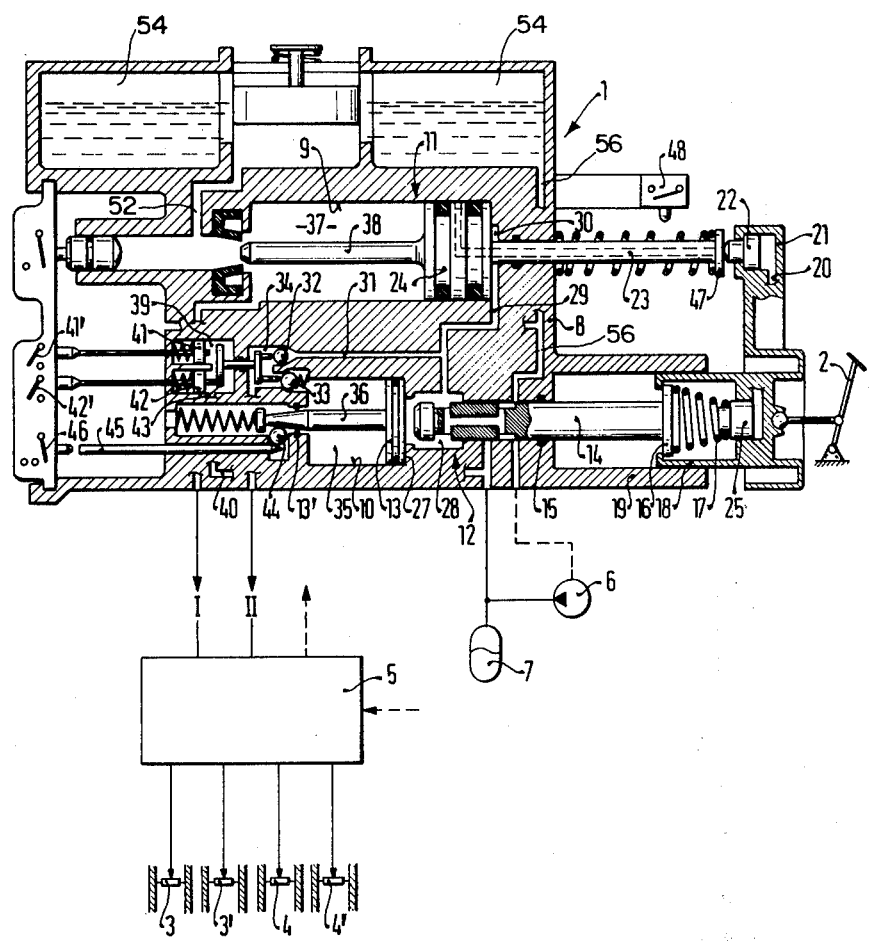
FIG. 1 shows a cross-sectional view of a first exemplary embodiment of a brake force amplifier.

A hydraulic brake force amplifier 1 is disposed in a hydraulic brake system between a brake pedal 2 and two pairs of wheel brake cylinders 3, 3' and 4, 4'. The first wheel cylinder pair 3, 3' is part of a brake circuit I and the other wheel cylinder pair 4, 4' is part of a brake circuit II. Both brake circuits I and II are monitored by a multiple-position adjusting member 5 of an automatic anti-locking apparatus, not shown.

A pressure source comprising a pump 6 and a reservoir 7, attached to a housing 8 of the brake force amplifier 1, serves the purpose of brake force amplification. Two parallel bores 9 and 10 are provided in the housing 8, the first bore 9 being intended for one main cylinder 11 and the other bore 10 being intended for a control valve 12 and for an arresting piston member 13 disposed behind the control valve 12.

The control valve 12 is a slide valve and has a slide 14, which, sealed off by means of an O-ring 15, protrudes out of the housing 8. At that point it is provided with an enlargement 16, which first acts as a contact surface for a travel-limiting spring 17 and second is grasped from behind by the inwardly bent end of a cylindrical body 18. In this manner, the travel-limiting spring 17 is inserted under initial stressing into the body 18.

The body 18 is guided in a hollow cylindrical protrusion 19 of the housing 8. Furthermore, the body 18 has an arm 21 penetrated by a longitudinal bore 20, and a piston 22 is inserted perpendicularly into the end of the arm 21. This piston is disposed opposite one end of a hollow push rod 23, which protrudes into the main cylinder 1 and there carries a main cylinder piston 24.

The longitudinal passageway bore 20 of the arm 21 leads, in the area of the travel-limiting spring 17, to a travel-limiting spring urged piston 25, which acts as a spring plate for the travel-limiting spring. The pistons 22 and 25, along with the fluid filling the longitudinal bore 20, comprise a hydraulic linkage, which functions as a means of both pressure equalization and failure prevention, with a corresponding stroke limitation.

The arresting piston member 13 generally rests, as shown, on a shoulder 27 of the housing and in this position limits the stroke of the control valve 12 and of the travel-limiting spring 17.

With its side oriented toward the control vavle 12, the arresting piston member 13 defines a primary pressure chamber 28, which communicates via a channel 29 with a primary pressure chamber 30 at the main cylinder piston 24. A branch line 31 leads from the channel 29 and via two counteracting, controllable check valves 32 and 33 into a chamber 34, which can be connected to a pressure chamber 35 provided adjacent to the rear of the arresting piston member 13. The pressure chamber 35 has passing through it a piston rod 36 secured on the piston member 13, which can be sealed off by means of a sealing ring 13' and acts as the secondary pressure chamber for the brake circuit II connected to chamber 34. A corresponding secondary pressure chamber 37 for brake circuit I has a piston rod 38 passing through it. The secondary pressure chamber 37 communicates through a line 52 to a supply chamber or relief location 54 and the fluid in said relief location is fed via a line 56 to the control valve 12. Line 56 also feeds fluid to the pump 6.

Finally, a further reservoir pressure chamber 39 is provided in the brake force amplifier, communicating via an angled pressure channel 40 with the pressure source 6, 7. Two pressure monitoring pistons 41 and 42 are disposed in this reservoir pressure chamber 39 and are forced to the left due to pressure on piston 43 of a switchover device exerted by pressure in chamber 34 which is connected with the pressure sources 6 and 7. The pistons 41 and 42 are provided with rods that operate switches 41' and 42'. With piston 43 under pressure, the pistons 41 and 42 will hold the switches 41' and 42' in their open position. If the pressure in pressure chamber 39 decreases due to a failure, pistons 41 and 42 move to the right which permits switches 41' and 42' to close. The switchover device 43 is provided with parallel fingers that control two check valves 32 and 33. With pressure applied in chamber 34, check valve 32 is in its open position which permits fluid under pressure to enter chamber 34. Check valve 33 is closed when there is pressure in chamber 34. As the switchover device moves to the right because of a pressure failure in sources 6 and 7, the fingers close check valve 32 and opens check valve 33. This operation eliminates the hydraulic arrest for the arresting piston 13 so that it functions as a main cylinder piston.

The switches 41' and 42' control electrical signals to an electronic switching device which evaluates the signals. The electronic switching device, not shown, controls magnetic valves which are arranged in the multiple-position adjusting member 5 which is well known in the art.

A brake light switch 46 can be actuated via a ball 44 and oblique surfaces on the piston rod 36 and on a switch rod 45.

MODE OF OPERATION

When the brake pedal 2 is actuated, pressure is directed by the control valve 12 into the two primary pressure chambers 28 and 30. Via the check valve 32 which is still open, the pressure medium proceeds via the chamber 34 into the brake circuit II, so that pressure is established in both brake circuits I and II. At the same time, the arresting pistion member 13 moves toward the left, until the piston rod 36 attains a sealing contact in the seal 13'. The brake light switch 46 is actuated via the ball 44.

If the pressure supply from the pressure source 6, 7 fails, then the pressure drop in the reservoir pressure chamber 39 permits valves 41 and 42 to move to the right which effects the response of the switches 41' and 42'. In addition, the switchover device 43 moves and reverses the position of the two check valves 32, 33 in such a manner that the valve 32 closes and the valve 33 opens. Now the force of the brake pedal 2 is exerted, on the one hand, directly via the arm 21 onto the main cylinder piston 24 and, on the other hand, via the slide 14 onto the arresting piston member 13. In both brake circuits I and II, a pressure is established, which pressure is derived from the secondary pressure chambers 35 and 37, which is proportional to the pedal force exerted. Due to the pressure exerted by pistons 13 and 24 braking occurs.

In addition, a shoulder 47 can be provided on the push rod 23 and a switch 48 can be provided on the housing 8; the switch 48 is then actuated by the shoulder 47 whenever, under corresponding pedal force, the arm 21 has traveled a predetermined distance.

As has already been noted at the outset, the disadvantage exists in brake systems having one open and one closed brake circuit that if the pressure supply fails one brake circuit also fails at the same time. The arresting piston member can then generate no further pressure.

A leak in the open brake circuit can be reduced by means of an appropriate logical combination of switching signals. For instance, if after brake actuation the pressure in the reservoir 7 drops to an extent exceeding what would be proportional, then switchover device 43 moves to the right which actuates the switches 41' and 42'. Now if, during the same braking process, the switch 48 remains unactuated, then this signifies that no pressure builds up in the primary pressure chamber 30 which would force piston 24 to the left whereby the switch 48 would be actuated by movement of the rod 23. The switch 48 actuates an electronic switching device which operates specific magnetic valves in the adjusting member 5.

The anti-locking multiple-position adjusting member 5 for brake circuit II is thereupon actuated via the electronic switching device. Now if the switch 48 responds and if there is, in some cases, also a pressure increase in the reservoir 7, then this is an indication of a leak in the corresponding brake circuit.

Upon a subsequent brake actuation, a logical signal combination of this kind can be interrogated again; however, it can also be stored in memory. The latter action has the result that upon each braking procedure, the anti-locking multiple-position adjusting member 5 is additionally actuated.

Figure 2:
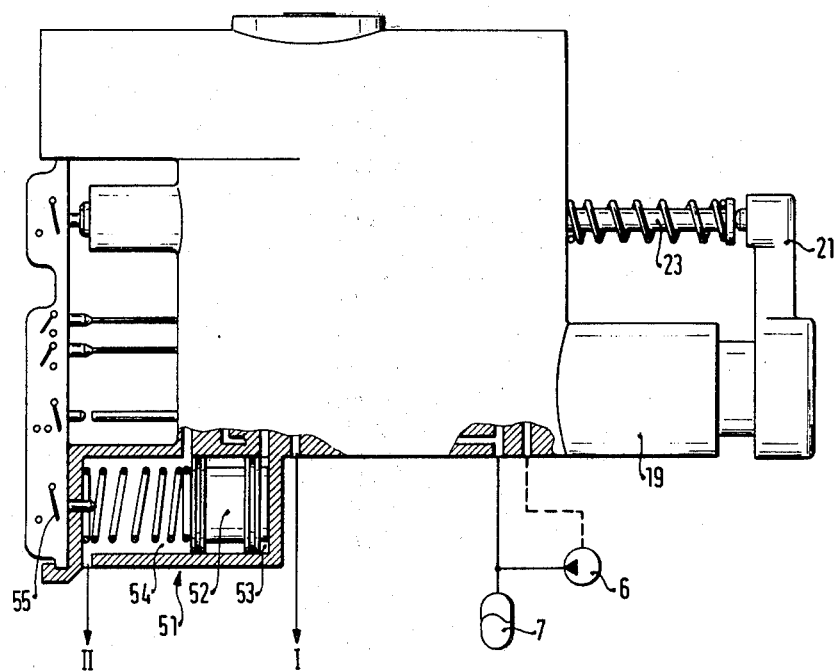
FIG. 2 shows a cross-sectional detailed view of a supplementary device incorporated into the brake force amplifier.

In FIG. 2, a further development of the structure shown in FIG. 1 is illustrated. Elements corresponding to the structure of FIG. 1 are given identical reference numerals.

A supplementary step-up device 51 has a piston 52, which defines two work chambers 53 and 54, the first of which communicates with brake circuit I and the second of which communicates with brake circuit II. By means of an appropriate dimensioning of the effective surfaces, this step-up device 51 can exhibit a pressure step-up property. A reservoir pressure switch 55 is provided on the side of the brake circuit II connection.

With a device of this kind, the advantage is obtained that it is not the brake circuit having the highest pressure level which determines the dimensioning of the brake force amplifier and the height of the pressure level in the pressure source 6, 7, but rather that the structural design can be optimized specifically for the individual brake circuits and for the pressure supply.

Figure 3:
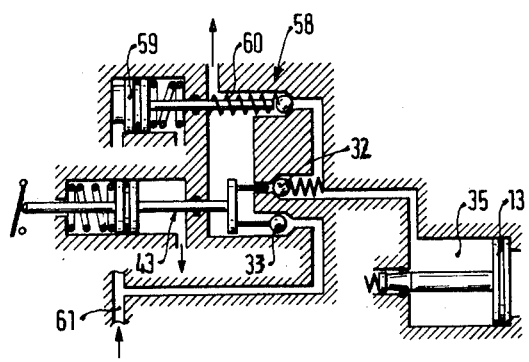
FIG. 3 shows a detailed cross-sectional view of a redundant switching valve incorporated into the system.

FIG. 3 shows that in addition to the check valves 33 and 34, a redundant switching valve 58 having a switching piston 59 can be used. This switching valve 58 is prestressed with a spring 60, so that the switching valve 58 does not open until a predetermined opening pressure, of 2 bar, for example, has been established. The spring 60 also has the purpose that the piston 59 which responds at conventional pressure closes the valve 58 reliably.

In this manner, it is attained that no pressure medium can flow out of the pressure chamber 35 at the arresting piston member 13, before the switching piston 59, exposed via a line 61 to the pressure directed by the control valve 12, still further increases the opening pressure. The dimensioning of the piston force of the switching piston 59 is designed such that even at the highest pedal force exerted on the arresting piston member 13, the appropriately high pressure is maintained by means of the switching valve 58.

The advantage of the structural type is that if the pressure supply fails no control valve pressure is established either, and thus the arresting action of the arresting piston member 13 is reliably precluded in this event.

Figure 4:
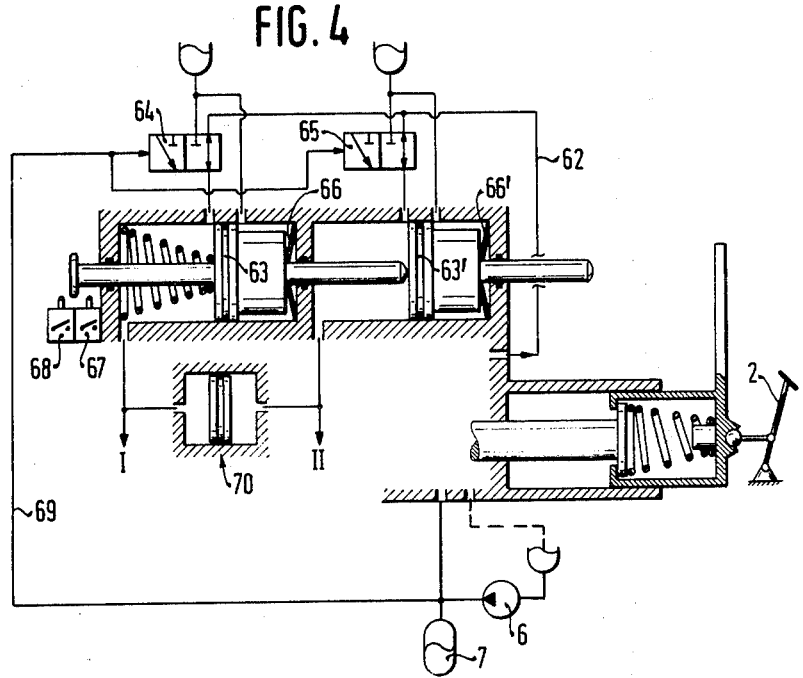
FIG. 4 shows another embodiment where a tandem-type arresting piston member is utilized.

In FIG. 4, finally, a device having two arresting piston members 63 and 63' in a tandem arrangement is shown. The brake valve pressure from the control valve 12 (see FIG. 1) proceeds via a line 62 and via a switchover device comprising two switchover valves 64 and 65 to the arresting piston members 63 and 63' and from thence to brake circuits I and II, respectively. The arresting piston members 63 and 63' act counter to a plate spring 66 and 66', so that a movement of the piston member occurs upon each actuation of the brake.

The piston member movement is utilized for actuating a brake light switch 67, while the arresting function is monitored by a switch 68. When the force at the pedal 2 is fully effective, this switch 68 is not permitted to respond.

The switchover device 64 and 65 is exposed via a line 69 to the pressure of the pressure source 6, 7. It has the task of shutting off the control valve pressure after pressure falls below a predetermined level and connecting the line to the arresting piston members 63, 63' with a relief location (supply container). Then the two arresting piston members 63, 63', just as in the exemplary embodiment of FIG. 1, act as a main cylinder piston. In order to establish the identical pressure level in both brake circuits I and II in this case, an equalizing piston member 70 is disposed between brake circuits I and II.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A hydraulic brake force amplifier for multiple-circuit brake systems, arranged to be actuated by a brake pedal via a travel-limiting spring and further provided with a control valve, said control valve adapted to control both a connection of a source of pressure medium with a main cylinder and a connection of the main cylinder with a relief location, said control valve further being disposed parallel to said main cylinder and connected therewith via a force transmitting device which cooperates with an arresting piston member, said arresting piston member arranged to limit the stroke of said control valve and capable of being switched off if the pressure supply fails, characterized in that said arresting piston member cooperates with means which permit its use as a second main cylinder upon pressure failure in said brake system.

2. A brake force amplifier as defined by claim 1, characterized in that said means are embodied by a switchover device subjected to the pressure medium, said switchover device being further adapted to control said arresting piston member so that it will switch over to one of two modes of operation at a particular time.

3. A brake force amplifier as defined by claim 2, characterized in that said switchover device is supplementarily equipped with a delayed switching valve, actuatable under the pressure of a switching piston.

4. A brake force amplifier as defined by claim 2, characterized in that said switchover device is monitorable by means of electrical switching signals.

5. A brake force amplifier as defined by claim 1, characterized in that said arresting piston member cooperates with a relief valve.

6. A brake force amplifier as defined by claim 1, characterized in that a multiple-position vale is combined with an anti-locking device.

7. A brake force amplifier as defined by claim 6, characterized in that said anti-locking device further includes adjusting members to sense leaks in said brake system.

8. A brake force amplifier as defined by claim 1, characterized in that said system further includes a hydraulic linkage having a failure prevention means including a piston, and further wherein said system further includes a force transmitting device disposed concentric with said control valve and that a pressure step-up means which is adjustable by means of the appropriate selection of said main cylinder piston is installed between said multiple brake circuits.

* * * * *